March 10, 1931.  A. E. GRANT  1,796,017

SEAL FOR ROTARY OIL PUMPS

Filed Sept. 29, 1927

INVENTOR.
Albert E. Grant
BY
ATTORNEYS.

Patented Mar. 10, 1931

1,796,017

UNITED STATES PATENT OFFICE

ALBERT E. GRANT, OF NEW YORK, N. Y., ASSIGNOR TO GRANT HEAT MACHINE CORPORATION, OF NEW YORK, N. Y., A CORPORATION OF DELAWARE

SEAL FOR ROTARY OIL PUMPS

Application filed September 29, 1927. Serial No. 222,927.

My invention relates to rotary pumps.

The object of my invention is to provide a pump which embodies means for packing the rotating driving shaft in such a manner as will cause the suction of the pump to act on said packing and cause it to closely embrace the shaft to effect a tight joint with a minimum of friction between the shaft and packing element.

The pump is designed primarily to pump oil for use in oil burning systems, and my construction is such that the oil being pumped serves to lubricate the bearings of the pump and the packing material.

In small pumps of the gear type, driven by a small electric motor, much of the power of the motor is absorbed by the packing means commonly employed to pack the shaft, and one object of my invention is to reduce the friction caused by the use of such old type packing by substituting therefor the simple construction herein described.

Referring to the drawings which form a part of this specification,

Figure 1:
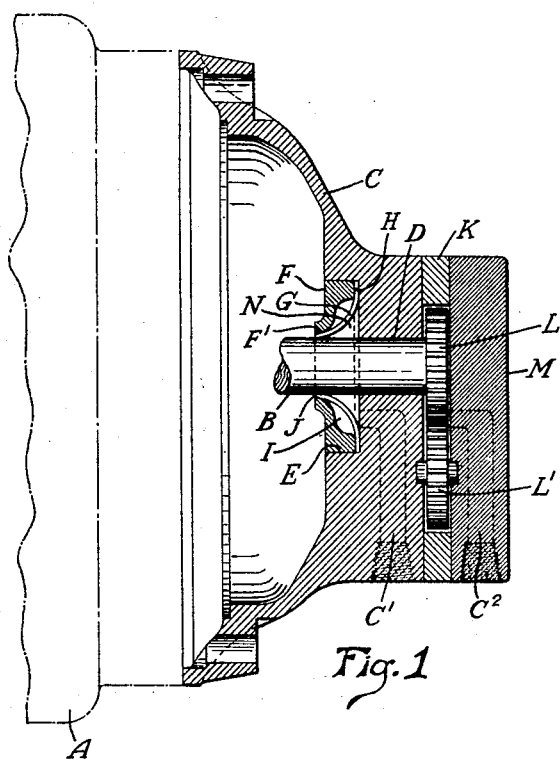
Fig. 1 is a vertical sectional view thru the cap portion of an electric motor, disclosing the main shaft and pump driven thereby, and showing the means used to pack the shaft.
Figure 2:
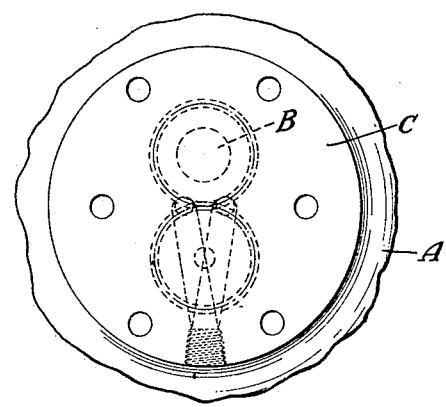
Fig. 2 is an end view of the cap portion of the pump, the pump construction and conduits for oil being shown in dotted lines.

A, indicates the casing of an electric motor, and B, the driving shaft thereof.

C, indicates the motor cap which is bolted to the casing A, and is provided with a cylindrical bore D, formed therein which serves as a bearing for the shaft B. A cylindrical recess E, is formed in the cap, the circular wall of which is formed concentric with the bore D, and a ring F, is fitted in said recess and clamps the outer edge of the flexible packing element G, firmly against the wall of the cap at H.

The inner side of the ring F, is cupped to provide a chamber I, thru which the packing element G, extends and embraces the shaft B, in air tight relation therewith at J.

The inner periphery of the ring F, presses against the packing element at its inner periphery F', to support it in perfect contact with the surface of the shaft B; however, this specific feature of the construction may be dispensed with without impairing the operation of the packing element when the motor is running, its chief function being to hold the joint tight when the motor is at rest.

K, indicates a section of the pump casing, in which are located the gears L and L' respectively, constituting a gear pump of the usual construction, and M indicates the outer cap of the casing. C' indicates a conduit for oil formed in the cap and leading to the annular space N, which is formed between the bottom wall of the recess E, and the packing element G, the oil flowing from this chamber thru the pump to the outlet conduit $C^2$ formed in the cap M. I prefer to use a disc shaped piece of elastic material such as soft vulcanized rubber reinforced by a woven fabric lining material, having a hole thru its centre of somewhat less diameter than that of the shaft, which, when forced over the shaft, will flex or bend to form as illustrated, and closely fit the shaft.

When the pump is operating, the suction draws the packing element toward the pump slightly, and by this action any wear at the bearing point will be compensated for since as the inner bearing surface wears away gradually, the curved wall of the packing element gradually assumes a cone shaped form without permitting any leakage of air into the pump chamber N, or allowing any oil to leak to the atmosphere.

The construction is now in use and has given excellent service, as the reduction of friction has increased the speed of the motor and therefore the capacity of the pump.

The cost of construction is also reduced.

Having thus described my invention I claim as new:

In a sealing device of the character described, a bearing for a motor shaft comprising a casing having a cylindrical chamber surrounding the shaft, a ring seated in said chamber, and formed with a concentric recess on its inner side, and a flexible packing disk located within said recess and clamped by said ring against the inner wall of said chamber, and against the periphery of the shaft, the outer edge of said disk being clamped by said ring and held in close contact with the shaft.

In testimony whereof I have affixed my signature.

ALBERT E. GRANT.